United States Patent
Brettell et al.

(10) Patent No.: US 7,590,812 B2
(45) Date of Patent: Sep. 15, 2009

(54) APPARATUS, SYSTEM, AND METHOD FOR ARCHIVING A LOG

(75) Inventors: David Alan Brettell, Vail, AZ (US); Gregory Tad Kishi, Oro Valley, AZ (US); Laura Jean Ostasiewski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/535,002

(22) Filed: Sep. 25, 2006

(65) Prior Publication Data
US 2008/0077757 A1 Mar. 27, 2008

(51) Int. Cl.
*G06F 12/00* (2006.01)

(52) U.S. Cl. .................. 711/162; 711/118; 711/161; 711/170; 711/173

(58) Field of Classification Search ........... None
See application file for complete search history.

(56) References Cited

U.S. PATENT DOCUMENTS

| | | | |
|---|---|---|---|
| 5,584,008 A | 12/1996 | Shimada et al. | 395/441 |
| 6,065,019 A | 5/2000 | Ault et al. | 707/206 |
| 6,529,996 B1 | 3/2003 | Nguyen et al. | 711/114 |
| 6,823,442 B1 | 11/2004 | Cameron | 711/220 |
| 6,952,757 B2 | 10/2005 | Carlson et al. | 711/161 |
| 6,981,114 B1 * | 12/2005 | Wu et al. | 711/162 |
| 2005/0235182 A1 | 10/2005 | Lee et al. | 714/726 |
| 2006/0069886 A1 | 3/2006 | Tulyani | 711/161 |

\* cited by examiner

*Primary Examiner*—Matt Kim
*Assistant Examiner*—Shawn X Gu
(74) *Attorney, Agent, or Firm*—Kunzler & McKenzie

(57) ABSTRACT

An apparatus, system, and method are disclosed for archiving log data. In one embodiment, an allocation module allocates a plurality of log logical volumes in a storage pool for storing copies of log instances. The log logical volumes may be hidden from a user. A log module records log data to at least one first log instance in a cache. A copy module transparently copies the at least one first log instance to a first log logical volume of a plurality of log logical volumes in a storage pool when a copy policy is satisfied. The log module further records the log data to at least one second log instance in the cache, overwriting the at least one first log instance. In one embodiment, a selection module selects a second log logical volume of the plurality of log logical volumes to receive the copied at least one second log instance if the first log logical volume satisfies a wrap policy.

20 Claims, 6 Drawing Sheets

APPARATUS, SYSTEM, AND METHOD FOR ARCHIVING A LOG

BACKGROUND OF THE INVENTION

1. Field of the Invention

This invention relates to data processing logs and more particularly relates to archiving data processing logs.

2. Description of the Related Art

Data processing devices and systems such as servers, server farms, storage subsystems, mainframe computers, and the like are often record operational events in log data files. As used herein, log data files are referred to as logs.

A log may record errors, performance metrics, start and end times for processes, and the like. A device and/or system may record a plurality of logs, with each log storing a different type of operational event. Alternatively, records for different types of operational events may be stored in a single log. Logs are typically written to a storage device such as a hard disk drive, an optical storage device, and the like.

Because logs are continuously recorded, data processing devices and/or systems typically overwrite previous logs on the storage device with more recent instances of the logs. For example, a device and/or system may overwrite a log with more recent log instance each day. Overwriting previous log instances effectively limits the accumulation of logs on storage devices.

Unfortunately, the time interval covered by the retained log instances may be insufficient for some diagnostic operations. For example, finding the root cause of a problem in a data processing system may require logs covering weeks or even months. A customer service engineer may be unable to identify a root cause without data from logs over an extended time interval. Yet if logs for significant time intervals are stored on the storage device, customers and users of the data processing system may be unhappy that such large volumes of data storage are devoted to logs. As used herein, customers and users are referred to collectively as users.

Users may also be unwilling to manually manage the archiving of logs covering an extended time interval. For example, if archiving the logs required significant quantities of storage, a user may be unwilling to organize the required storage.

SUMMARY OF THE INVENTION

From the foregoing discussion, there is a need for an apparatus, system, and method that archive logs. Beneficially, such an apparatus, system, and method would transparently archive logs for later analysis.

The present invention has been developed in response to the present state of the art, and in particular, in response to the problems and needs in the art that have not yet been fully solved by currently available log archiving methods. Accordingly, the present invention has been developed to provide an apparatus, system, and method for archiving logs that overcome many or all of the above-discussed shortcomings in the art.

The apparatus to archive logs is provided with a plurality of modules configured to functionally execute the steps of recording log data to a first log instance, copying the first log instance to a first logical volume, and recording the log data to a second log instance. These modules in the described embodiments include a log module and a copy module. The apparatus may also include a selection module and an allocation module.

The log module records log data to the first log instance in a cache. The log data may include details of errors, performance metrics, beginning and end times for processes, the addition of devices, the removal of devices, and the like. For simplicity the first log instance will be referred to hereafter in the singular, although the first long instance may include a plurality of data sets.

The copy module copies the first log instance to a first log logical volume when a copy policy is satisfied. The first log logical volume is part of a plurality of log logical volumes configured to store log instances. In one embodiment, the plurality of log logical volumes are hidden from a user. The log module may further record the log data to a second log instance in the cache, overwriting the first log instance.

In one embodiment, the allocation module allocates plurality of log logical volumes in the storage pool for storing copies of log instances. The selection module may select a second log logical volume to receive the copied second log instance from the cache. In a certain embodiment, the selection module selects the second log logical volume in response to the first log logical volume satisfying a wrap policy. The apparatus archives a plurality of log instances to the storage pool so that the log instances are available for diagnosing problems such as finding root causes of errors.

A system of the present invention is also presented to archive logs. The system may be embodied in a magnetic tape subsystem. In particular, the system, in one embodiment, includes a storage controller, a cache, and a tape library.

The cache may be a hard disk drive, an optical storage device, a micromechanical storage device, a holographic storage device, a semiconductor storage device, or the like. The tape library stores data in a plurality of storage pools organized on a plurality of magnetic tapes.

The storage controller manages the cache and the tape library. The storage controller may store data to the cache, and then migrate the data from the cache to the tape library. Similarly, the storage controller may retrieve data from the tape library to the cache, and migrate the retrieved data to a host.

The storage controller includes a log module and a copy module. In addition, the storage controller may include a selection module and an allocation module. The allocation module may allocate a plurality of log logical volumes for storing copies of log instances. The plurality of log logical volumes may be hidden from a user. The log module records log data to a first log instance in the cache. The copy module transparently copies the first log instance to a first log logical volume when a copy policy is satisfied so that a user is unaware that the first log instance is archived.

The log module further records log data to a second log instance in the cache, overwriting the first log instance. In one embodiment, the selection module selects a second log logical volume to receive the copied second log instance from the cache if the first log logical volume satisfies a wrap policy. The system transparently archives log instances so that the log instances are available but may be hidden from the user.

A method of the present invention is also presented for archiving logs. The method in the disclosed embodiments substantially includes the steps to carry out the functions presented above with respect to the operation of the described apparatus and system. In one embodiment, the method includes recording log data to a first log instance, copying the first log instance to a first log logical volume, and recording the log data to a second log instance. The method also may include allocating a plurality of log logical volumes and selecting a second log logical volume.

In one embodiment, an allocation module allocates a plurality of log logical volumes in a storage pool for storing copies of log instances. The log logical volumes may be hidden from a user. A log module records log data to at least one first log instance in a cache. A copy module transparently copies the at least one first log instance to a first log logical volume of a plurality of log logical volumes in a storage pool when a copy policy is satisfied. The log module further records the log data to at least one second log instance in the cache, overwriting the at least one first log instance. In one embodiment, a selection module selects a second log logical volume of the plurality of log logical volumes to receive the copied at least one second log instance if the first log logical volume satisfies a wrap policy, wherein each log logical volume is selected in a specified order. The method transparently archives log instances to log logical volumes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention transparently archives log instances to a first logical volume. In addition, the present invention may continue archiving additional log instances to a second logical volume when the first logical volume satisfies a wrap policy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
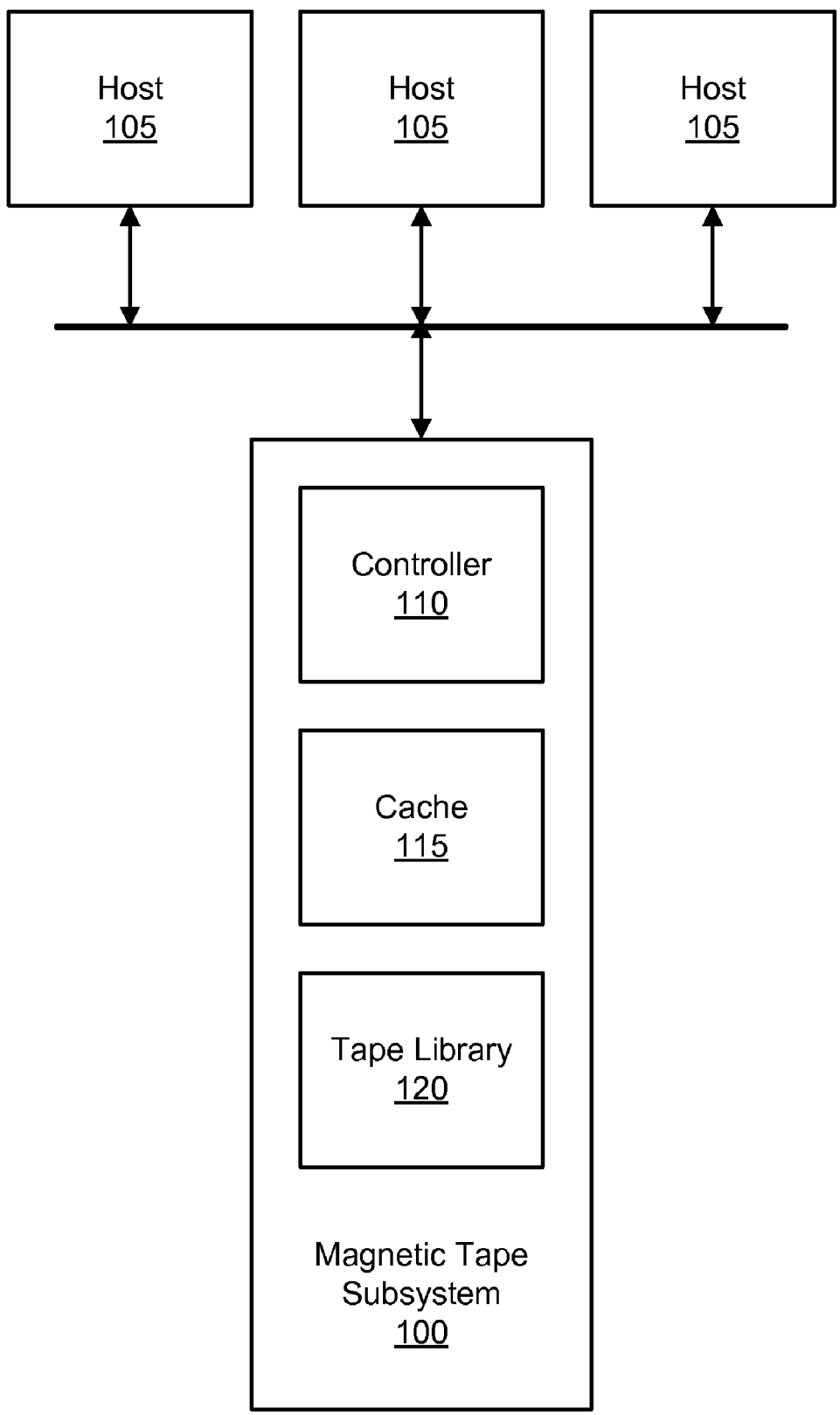
FIG. 1 is a schematic block diagram illustrating one embodiment of a magnetic tape subsystem in accordance with the present invention.

FIG. 1 is a schematic block diagram illustrating one embodiment of a magnetic tape subsystem 100 in accordance with the present invention. The subsystem 100 includes a controller 110, a cache 115, and a tape library 120. Although for simplicity the subsystem 100 is shown with one controller 110, one cache 115, and one tape library 120, any number of controllers 110, caches 115, and tape libraries 120 may be employed.

The subsystem 100 stores data. In one embodiment, the subsystem 100 stores data for one or more hosts, servers, mainframes, clients, and the like that are collectively referred to herein as hosts 105. The hosts 105 may be in communication with the subsystem 100 through a dedicated data bus, a fiber optic channel, a network, the Internet, or the like.

In one embodiment, users of the hosts 105 may purchase portions of the storage volume of the subsystem 100. For example, a user of a first host 105 may purchase six terabytes (6 TB) of storage volume while a user of a second host 105 may purchase two terabytes (2 TB) of storage volume. In addition, the hosts 105 may remotely manage the purchased capacity.

The subsystem 100 may receive data from a host 105 and store the data. Similarly, the subsystem 100 may retrieve stored data for the host 105 and communicate the retrieved data to the host 105 and/or a specified destination. In one embodiment, the subsystem 100 backs up stored data, and otherwise manages data for the hosts 105.

The controller 110 may communicate with the hosts 105 and store and retrieve data as directed by the hosts 105. In addition, the controller 110 may direct the performance of maintenance functions for the subsystem 100 such as formatting physical volumes, partitioning logical volumes, and the like. The controller 110 may include a processor and memory as is well known to those of skill in the art. The memory may store and the processor may execute one or more controller readable programs. The controller readable programs may be stored in one or more controller useable mediums such as the memory, a hard disk drive, or the like. The controller readable programs may cause the controller to perform functions as will be described hereafter.

The tape library 120 stores data. In one embodiment, the tape library stores data on magnetic tape. The magnetic tape may be disposed in cartridges, wound on reels, or the like. The magnetic tape may be manually mounted to a tape drive. Alternatively, the magnetic tape may be mounted to the tape drive by one or more robotic transport devices.

The cache 115 also stores data and may be a hard disk drive, an optical storage device, a semiconductor storage device, or the like. In one embodiment, the cache 115 includes a plurality of different storage devices such as hard disk drives and semiconductor storage devices.

The storage controller 110 manages the cache 115 and the tape library 120 to store and retrieve data. For example, the storage controller 110 may receive data from a host 105 and store the data to the cache 115. The storage controller 110 may then migrate the data from the cache 115 to the tape library 120 and delete the data from the cache 115. The tape library 120 may write the data to one or more logical volumes organized on one or more physical volumes with the tape library 120.

Similarly, the controller 110 may in response to a host request retrieve data from the tape library 120 to the cache 115. The controller 110 may then migrate the retrieved data to the requesting host 105 and delete the data from the cache 115. In one embodiment, the controller 110 retains data in the cache 115 for extended periods, and only writes data to the tape library 120 when specified conditions are met.

The controller 110 stores information regarding the operation of the subsystem 100 in logs. For example, the controller 110 may store performance data, information about errors, descriptions of the configurations of logical and physical volumes, and the like in one or more logs. In one embodiment, the controller 110 stores the information in a plurality of log types, such as performance measurement logs, error logs, configuration logs, and the like.

For example, a performance measurement log may store performance metrics for the tape library 120, detailing the latency times for reads and writes, tape drive mounts per hour, gigabytes (GB) of data stored per hour, and the like. Similarly, an error log may detail an error condition, listing a type of error, the tape drives, logical volumes, and physical volumes that are involved with the error condition, related subsystem conditions, and the like.

The controller 110 may store the logs to the cache 115. In the past, the controller 110 overwrote older instances of logs with newer instances of logs to prevent the logs from occupying too much of the cache storage volume. Unfortunately, overwriting and/or otherwise deleting older log instances destroys useful information.

For example, finding the root causes of recurring error scenarios may require information from log instances covering an extended period of time. A customer engineer may extract and organize the information from the plurality of log instance for valuable clues in determining the causes of errors.

While the subsystem 100 could store the additional log instances, users of the subsystem 100 often object to allocating valuable storage volume to logs that the users may not directly use, particularly if the users do not directly employ the customer engineer. The present invention archives the logs as will be described hereafter so that a plurality of log instances are available if needed. In addition, the present invention may hide the archived log instances.

Figure 2:
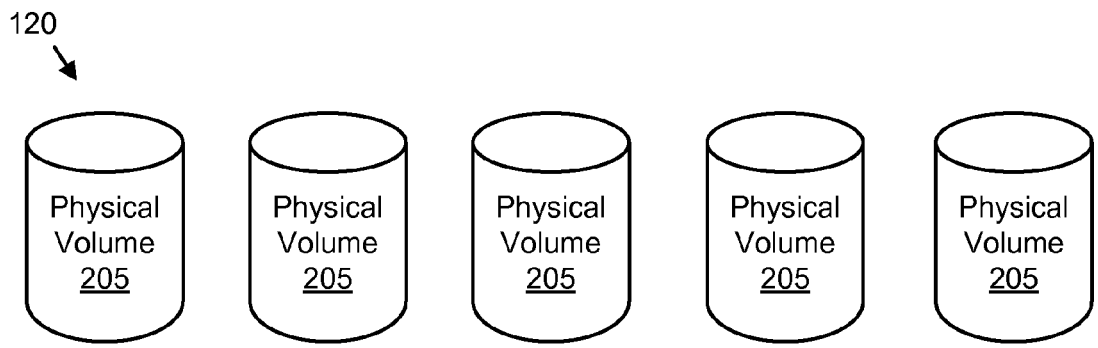
FIG. 2 is a schematic block diagram illustrating one embodiment of physical volumes in accordance with the present invention.

FIG. 2 is a schematic block diagram illustrating one embodiment of physical volumes 205 of the tape library 120 in accordance with the present invention. The description of the physical volumes 205 refers to elements of FIG. 1, like numbers referring to like elements.

The tape library 120 is shown with a plurality of physical volumes 205. Although for simplicity only five physical volumes 205 are shown, the tape library 120 may employ any number of physical volumes 205. In one embodiment, each physical volume 205 is a magnetic tape. Each physical volume 205 may include one or more physical partitions such as timing marks. In addition, each physical volume 205 may include one or more logical partitions such as headers.

Figure 3:
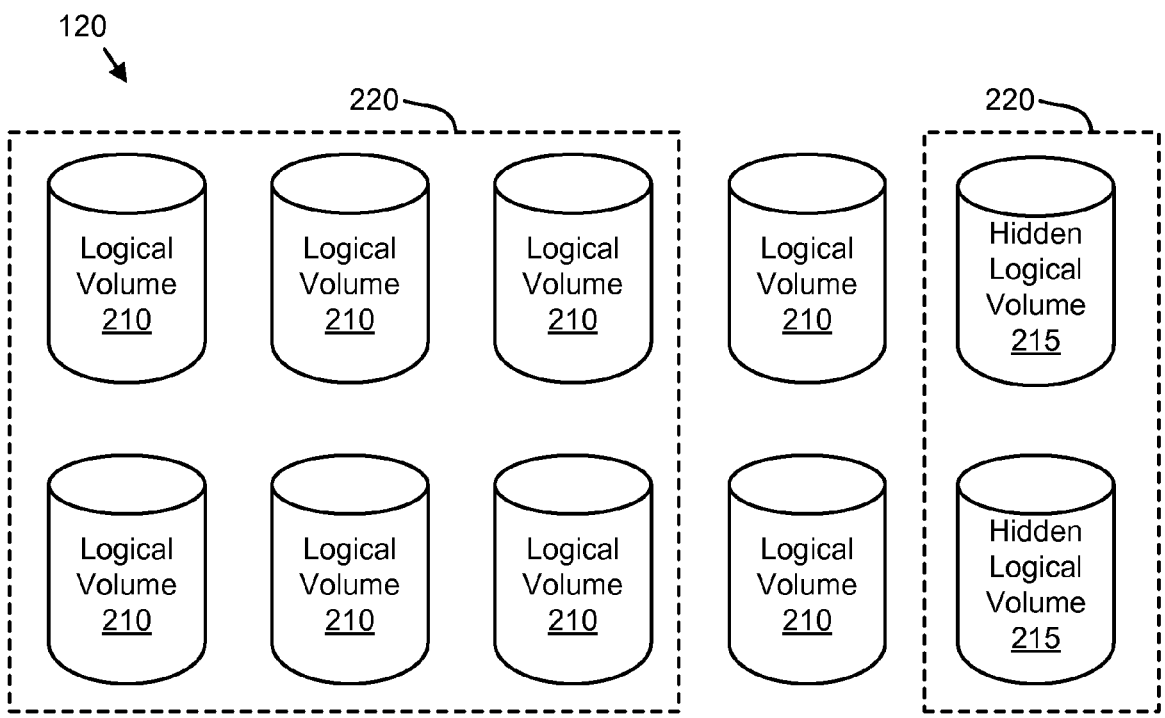
FIG. 3 is a schematic block diagram illustrating one embodiment of logical volumes in accordance with the present invention.

FIG. 3 is a schematic block diagram illustrating one embodiment of logical volumes 210 of the present invention. The description of the logical volumes 210 refers to elements of FIGS. 1-2, like numbers referring to like elements. The logical volumes 210 may be organized from the physical volumes 205 of FIG. 2. For example, a logical volume 210 may include portions of one or more physical volumes 205. The logical volume 210 may be demarked by headers recorded on the physical volumes, physical addresses stored by the controller 110, or the like.

The hosts 105 in communication with the magnetic tape subsystem 100 may write data to and retrieve data from the logical volumes 210. For example, a host 105 may retrieve data from the magnetic tape subsystem 100 using a logical address of a logical volume 210. The host 105 may have no information about the physical location of the data on a physical volume 205. The controller 110 may convert the logical address to a physical address of a physical volume 205 in the tape library 120.

In one embodiment, portions of one or more physical volumes 205 may also be organized as hidden logical volumes 215. Each hidden logical volume 215 may store data at logical addresses like the logical volumes 210. However, the hidden logical volumes 215 may be known only to the controller 110. Thus, in response to a user request for the identities of the volumes of the tape library 120, the controller 110 may only return the identities of the logical volumes 210, while the controller 110 would not return the identities of the hidden logical volumes 215.

The hidden logical volumes 215 are still available to store data for one or more functions of the magnetic tape subsystem 100. For example, the hidden logical volumes 215 may store backup data, be used in data recovery operations, and perform other functions. The present invention may employ the hidden logical volumes 215 to archive log instances as will be described hereafter.

In one embodiment, one or more logical volumes 210 may be organized as one or more storage pools 220. Hidden logical volumes 215 may also be organized as one or more storage pools 220. In one embodiment, one or more storage pools 220 may be allocated to a customer.

Figure 4:
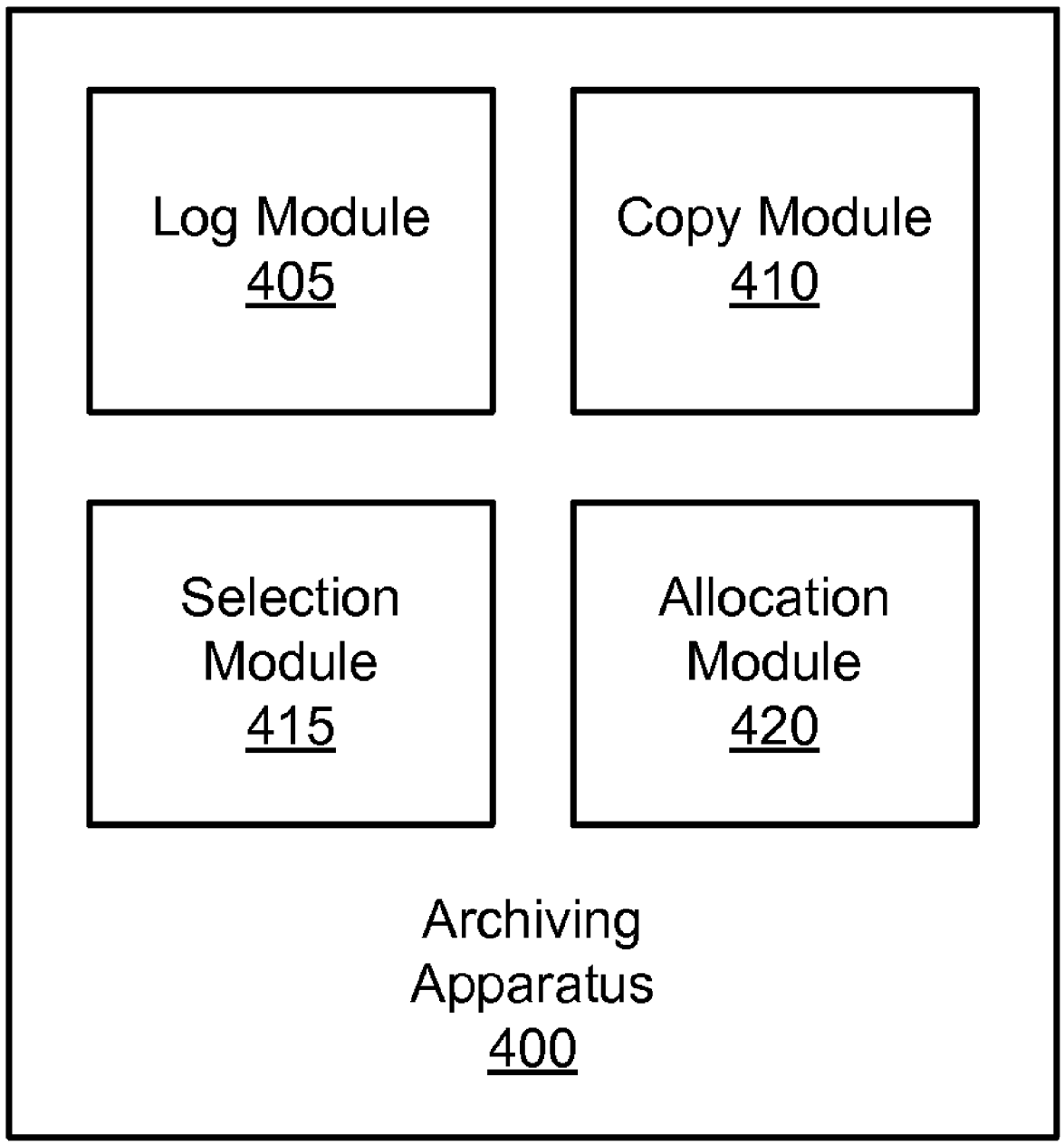
FIG. 4 is a schematic block diagram illustrating one embodiment of an archiving apparatus of the present invention.

FIG. 4 is a schematic block diagram illustrating one embodiment of an archiving apparatus 400 of the present invention. The description of the apparatus 400 refers to elements of FIGS. 1-3, like numbers referring to like elements. The apparatus 400 includes a log module 405 and a copy module 410. In addition, the apparatus 400 may include a selection module 415 and an allocation module 420.

In one embodiment, the log module 405, copy module 410, selection module 415, and allocation module 420 are embodied in one or more controller readable programs stored in the memory and executing on the processor of the controller 110. Alternatively, software processes comprising portions of the log module 405, copy module 410, selection module 415, and allocation module 420 may be stored on and be executed by one or more hosts 105.

The log module 405 records log data to a first log instance in the cache 115. The log data may include details of errors, performance metrics, beginning and end times for processes, the addition of devices, the removal of devices, and the like. For simplicity the first log instance will be referred to hereafter in the singular, although the first long instance may include a plurality of data sets.

The copy module 410 copies the first log instance from the cache 115 to a first logical volume 210 when a copy policy is satisfied. In one embodiment, the copy policy is satisfied when a specified number of log instances are stored on the cache 115.

The first logical volume 210 is part of a plurality of logical volumes 210. In one embodiment, the plurality of logical volumes 210 are hidden from the user as hidden logical volumes 215. In addition, the plurality of logical volumes 210 maybe excluded from a count of storage volume allocated to the user and/or for which the user is billed. The copy module 410 copying the first log instance to the first logical volume 210 may be transparent to the user. For example, the user need not initiate the copy, and the copy may not be reported to the user.

The log module 405 may further record the log data to a second log instance in the cache 115, overwriting the first log instance. For example, after the first log instance is copied to the first logical volume 210, the log module 405 may continue to collect and record similar log data as the second log instance, recording the second log instance in the cache 115.

In one embodiment, the allocation module 415 allocates a plurality of logical volumes 210 in a storage pool 220 for storing copies of log instances. The allocation module 415 may automatically allocate the plurality of logical volumes 210 as hidden logical volumes 215, without intervention and/or direction from the user.

In one embodiment, the selection module 415 selects a second logical volume 210 to receive the copied second log instance from the cache 115. The second logical volume may be included in the plurality of logical volumes 210. The selection module 415 may select the second logical volume 210 in response to the first logical volume 210 satisfying a wrap policy. For example, the first logical volume 210 may satisfy the wrap policy when a number of log instances copied to the first logical volume 210 exceeds a specified number.

In one embodiment, the selection module 415 deletes log instances that have resided on a logical volume 210 and/or a hidden logical volume 215 for a specified time interval. For example, the selection module 415 may delete log instances that have resided on a hidden log volume 215 for six months. In one embodiment, the copy module 410 time stamps each log instance that is copied to a logical volume 210 and/or hidden logical volume 215 so that a time interval that a log instance has resided on a volume 210, 215 may be determined. The apparatus 400 archives a plurality of log instances to the storage pool 220 so that the log instances are available for diagnosing problems such as finding root causes of errors.

Figure 5:
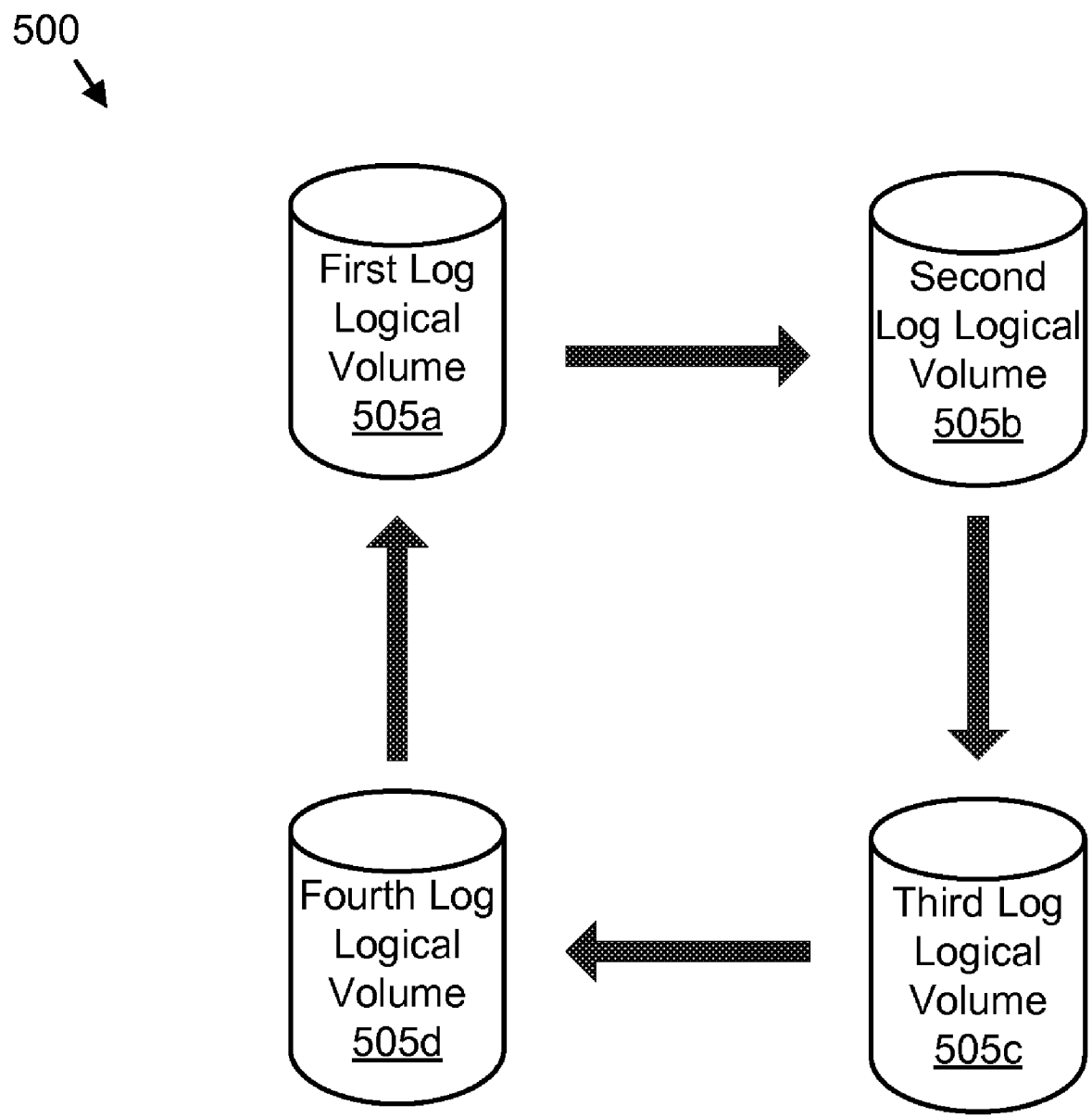
FIG. 5 is a schematic block diagram illustrating one embodiment of a wrapping process of the present invention.

FIG. 5 is a schematic block diagram illustrating one embodiment of a wrapping process 500 of the present invention. The description of the process 500 refers to elements of FIGS. 1-4, like numbers referring to like elements. The process 500 includes one or more log logical volumes 505. The allocation module 420 allocates the log logical volumes 505 to store log instances. Although for simplicity four log logical volumes 505 are shown, any number of log logical volumes 505 may be employed.

In one embodiment, each log logical volume 505 is a hidden logical volume 215. Alternatively, each log logical volume 505 may be a logical volume 210. In a certain embodiment, log logical volumes 505 may be either logical volumes 210 or hidden logical volumes 215. The phrase log logical volume 505 is used herein for convenience to refer to logical volumes 210 and/or hidden logical volumes 215 that are selected to receive and archive log instances.

The selection module 415 may select each log logical volume 505 in a specified order. For example, the selection module 415 may select a first log logical volume 505a to receive copied log instances. When the first log logical volume 505a satisfies the wrap policy, the selection module 415 may select a second log logical volume 505b and so on to the fourth log logical volume 505d.

In addition, the selection module 415 may wrap to the first log logical volume 505a from the fourth log logical volume 505d when the fourth log logical volume 505d satisfies the wrap policy. In one embodiment, the log instances on the first log logical volume 505a and subsequent log logical volumes 505 are overwritten after the selection module 415 wraps to the first log logical volume 505a. For example, a first log instance written the to first log logical volume 505a may later by overwritten by a fifth log instance. By overwriting log instances in the log logical volumes 505, the present invention may limit the number and/or volume of log instances that are retained.

By retaining a plurality of log instances, the log logical volumes 505 archive the log instances, making the log instances available for future analysis. For example, a customer engineer may retrieve the archived log instances for analysis. When analyzed, the archived log instances may allow the customer engineer to determine a root cause of one or more errors occurring within the magnetic tape subsystem 100.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
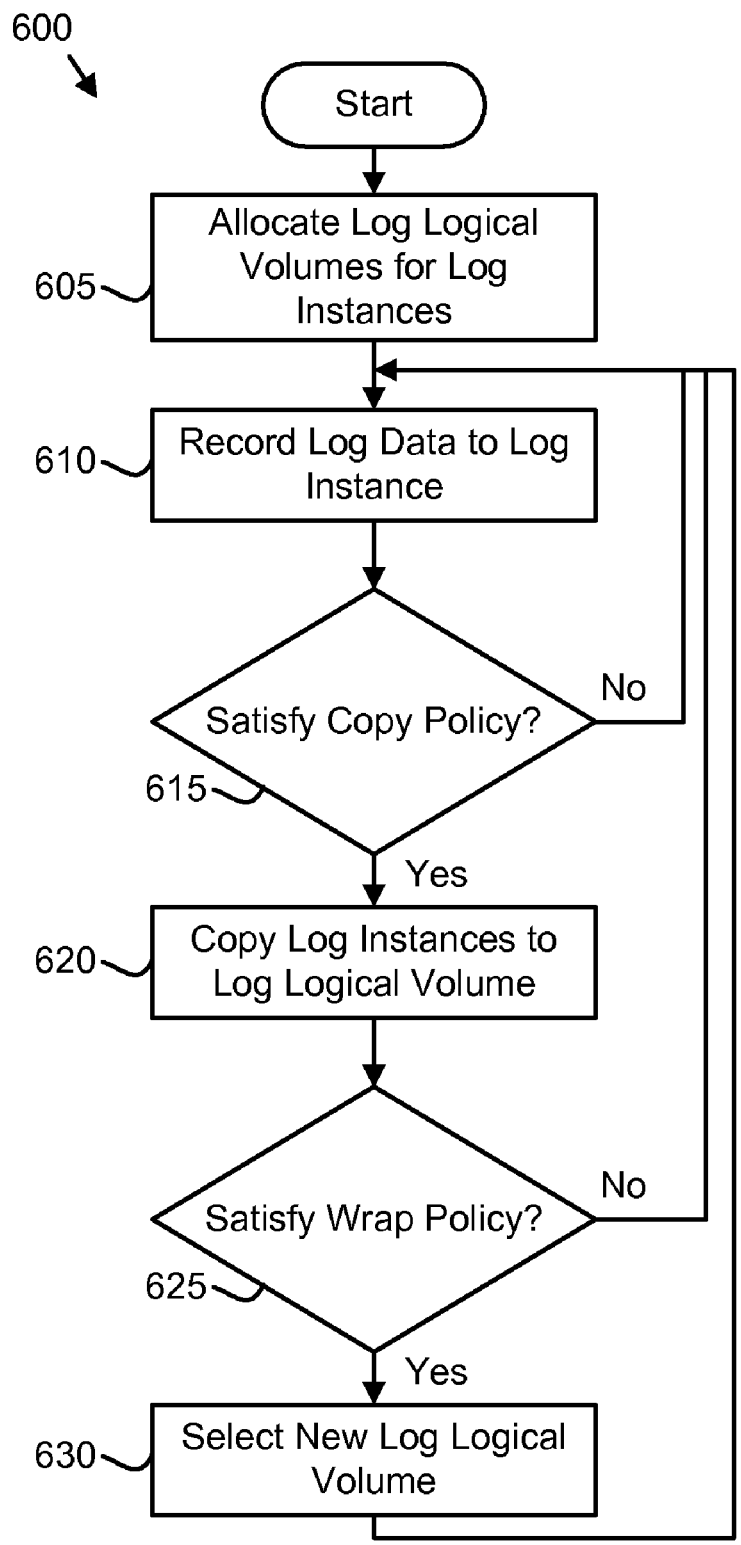
FIG. 6 is a schematic flow chart diagram illustrating one embodiment of an archiving method of the present invention.

FIG. 6 is a schematic flow chart diagram illustrating one embodiment of an archiving method 600 of the present invention. The method 600 substantially includes the steps to carry out the functions presented above with respect to the operation of the described apparatus 400, process 500, and subsystem 100 of FIGS. 4, 5, and 1 respectively. The description of the method 600 refers to elements of FIGS. 1-5, like numbers referring to like elements.

The method 600 begins and in one embodiment, the allocation module 420 allocates 605 a plurality of log logical volumes 505 in a storage pool 220 for storing copies of log instances. The controller 110 may store the identities of the log logical volumes 505 in memory, and make the identities available to the log module 405, the copy module 410, and the selection module 415.

In one embodiment, the storage pool 220 is hidden from the user. For example, the user may not have access to and/or be billed for the storage pool 220. In one embodiment, the allocation module 420 allocates thirty-two log logical volumes 505 to the storage pool 220.

The log module 405 records 610 log data to at least one first log instance in the cache 115. In one embodiment, the controller 405 stores log data in memory. The log module 415 may periodically write the log data from the memory to one or more log instances in the cache 115. Alternatively, the log module 415 may open one or more data sets for the at least one first log instance and record 610 the log data as the log data is generated. Data sets may be files, databases, or the like.

A copy module 410 determines 615 if a copy policy is satisfied. For example, the copy policy may be satisfied when fifty (50) log instances are stored in the cache 115. Alternatively, the copy policy may be satisfied when a specified storage volume of the cache 115 is occupied by log instances. For example, the copy module 410 may determine that the copy policy is satisfied when two gigabytes (2 GB) of log instances are stored in the cache 115.

If the copy module 410 determines that the copy policy is not satisfied, the log module 405 continues to record 610 log data to one or more log instances in the cache 115. The cache 115 accumulates the log instances until the copy policy is satisfied.

If the copy module 410 determines 615 that copy policy is satisfied, the copy module 410 transparently copies 620 the at least one first log instance to a first log logical volume 505 of a plurality of log logical volumes 505 in the storage pool 220. In one embodiment, the copy module 410 deletes the copied at least one first log instance from the cache 115. Alternatively, the copied at least one first log instance is subsequently overwritten.

In one embodiment, the selection module 415 determines 625 if the first log logical volume 505a satisfies a wrap policy. For example, the first log logical volume 505 may satisfy the wrap policy when a number of log instances copied to the first log logical volume 505a exceeds a specified number such as two hundred and fifty (250) log instances.

Alternatively, the first log logical volume 505a may satisfy the wrap policy when the storage volume occupied by the log instances stored on the first log logical volume 505a exceeds a specified storage volume. For example, the first log logical volume 505 may satisfy the wrap policy if ten gigabytes (10 GB) of log instances are stored on the first log logical volume 505a.

If the selection module 415 determines 625 that the first log logical volume 505a does not satisfy the wrap policy, the log module 405 further records 610 the log data to at least one second log instance in the cache 115, overwriting the at least one first log instance. If the wrap policy is satisfied, the selection module 415 selects 630 a second log logical volume 505b of the plurality of log logical volumes 505 to receive the copied at least one second log instance. In addition, the log module 405 records 610 the log data to at least one second log instance in the cache 115. The method 600 transparently archives log instances to the log logical volumes 505.

Figure 7A:
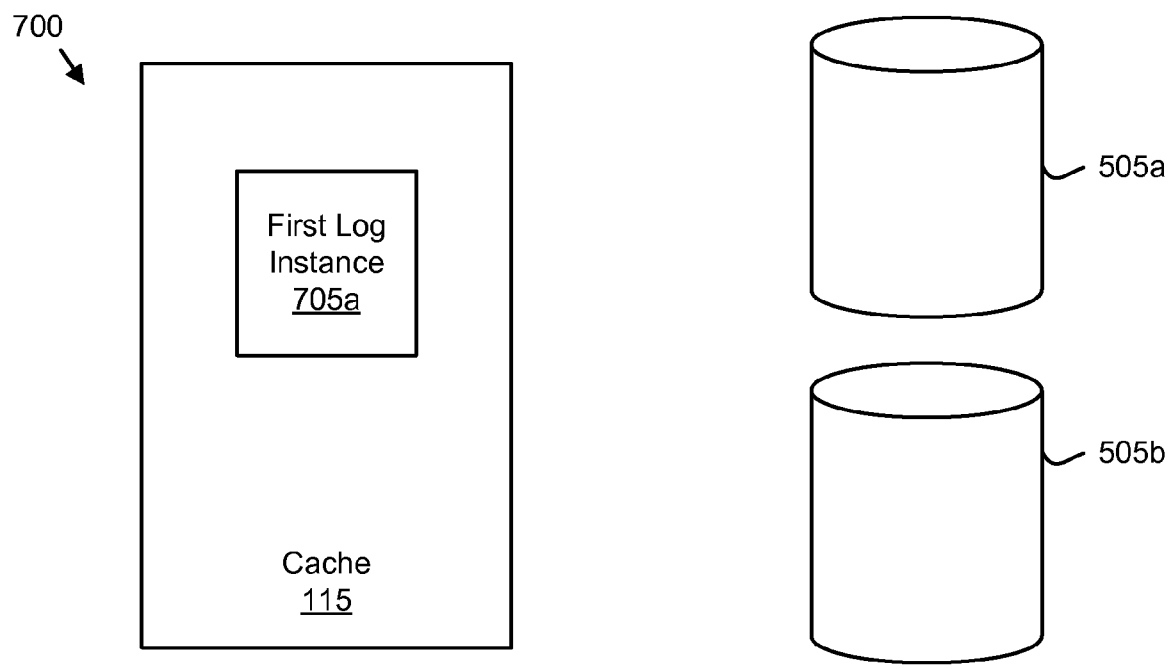
FIG. 7A is a schematic block diagram illustrating one embodiment of storing log data of the present invention.

FIG. 7A is a schematic block diagram illustrating one embodiment of storing log data 700 of the present invention. The description of storing log data 700 refers to elements of FIGS. 1-6, like numbers referring to like elements. The cache 115 is shown storing a first log instance 705a recorded 610 by the log module 405. The first and second log logical volumes 505a, 505b are also shown.

Figure 7B:
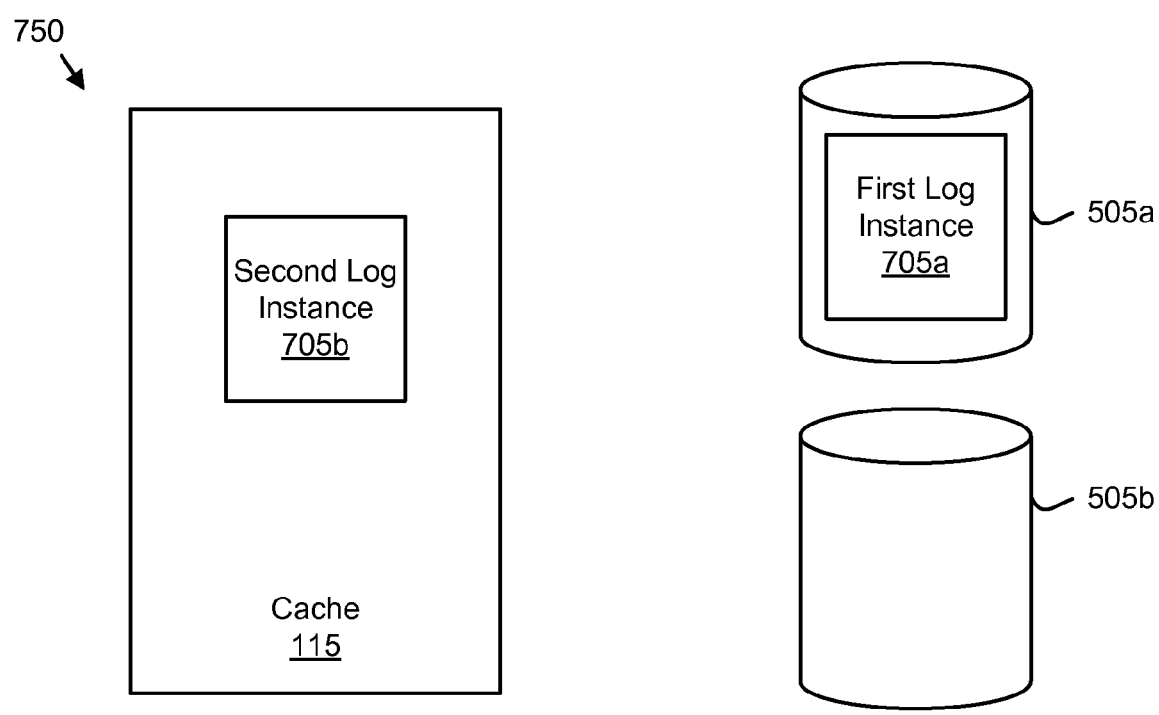
FIG. 7B is a schematic block diagram illustrating one embodiment of copying log instances of the present invention.

FIG. 7B is a schematic block diagram illustrating one embodiment of copying log instances 750 of the present invention. The first log instance 705a, cache 115, and log logical volumes 505 of FIG. 7B are shown. In addition, the description refers to elements of FIGS. 1-7A, like numbers referring to like elements.

As depicted, the copy module 410 determines 615 the copy policy is satisfied. The copy module 410 copies 620 the first log instance 705a from the cache 115 to the first log logical volume 505a. In addition, the log module 405 records 610 log data to a second log instance 705b in the cache 115.

The present invention transparently archives log instances 705 to a first log logical volume 505a. In addition, the present invention may continue archiving additional log instances 705 to a second log logical volume 505b when the first log logical volume 505a satisfies a wrap policy. Thus, archival log instances 705 are available to be analyzed to determine root causes of errors and/or provide similar information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to archive a log, the apparatus comprising:
a controller useable storage medium storing a controller readable program;

a processor executing the controller readable program, the controller readable program comprising
a log module configured to record first log data to at least one first log instance in a cache;
a copy module configured to copy the at least one first log instance to a first log logical volume of a plurality of log logical volumes in a storage pool when a copy policy is satisfied, wherein the copy is transparent to a user and the plurality of log logical volumes are not included in a billable storage volume count;
the log module further configured to record second log data to at least one second log instance in the cache, overwriting the at least one first log instance; and
a selection module configured to select a second log logical volume of the plurality of log logical volumes to receive the at least one second log instance from the cache in response to the first log logical volume satisfying a wrap policy.

2. The apparatus of claim 1, wherein each log logical volume is selected in a specified order.

3. The apparatus of claim 1, wherein the wrap policy is satisfied when a number of log instances copied to the first log logical volume exceeds a specified number.

4. The apparatus of claim 1, the computer readable program further comprising an allocation module configured to allocate the plurality of log logical volumes in the storage pool for storing copies of log instances.

5. The apparatus of claim 1, wherein the copy policy is satisfied when a number of log instances recorded in the cache exceeds a specified threshold.

6. The apparatus of claim 1, wherein the copy policy is satisfied when a storage volume of the at least one first log instance exceeds a specified threshold.

7. The apparatus of claim 1, wherein the first and second log data comprises performance metrics for a storage subsystem.

8. A controller useable storage medium storing a controller readable program, wherein the controller readable program when executed by a controller causes the controller to:
record first log data to at least one first log instance in a cache;
copy the at least one first log instance to a first log logical volume of a plurality of log logical volumes in a storage pool when a copy policy is satisfied, wherein the copy is transparent to a user and the plurality of log logical volumes are not included in a billable storage volume count;
record second log data to at least one second log instance in the cache, overwriting the at least one first log instance; and
select a second be logical volume of the plurality of log logical volumes to receive the at least one second log instance from the cache in response to the first log logical volume satisfying a wrap policy.

9. The controller useable storage medium of claim 8, wherein each log logical volume is selected in a specified order.

10. The controller useable storage medium of claim 8, wherein the wrap policy is satisfied when a number of log instances copied to the first log logical volume exceeds a specified number.

11. The controller useable storage medium of claim 8, wherein the controller readable program is further configured to cause the controller to allocate the plurality of log logical volumes in the storage pool for storing copies of log instances.

12. The controller useable storage medium of claim 8, wherein the copy policy is satisfied when a number of log instances recorded in the cache exceeds a specified threshold.

13. The controller useable storage medium of claim 8, wherein the copy policy is satisfied when a storage volume of the at least one first log instance exceeds a specified threshold.

14. The controller useable storage medium of claim 8, wherein the first and second log data comprises performance metrics for a storage subsystem.

15. The controller useable storage medium of claim 8, wherein the controller readable program is further configured to cause the controller to delete a log instance from a third log logical volume of the plurality of log logical volumes after the third log logical volume has stored the log instance for a specified time interval.

16. A system to archive a log, the system comprising:
a cache configured to store data;
a tape library configured to store data in a plurality of storage pools organized on a plurality of magnetic tapes,
a controller configured to manage the cache and the tape library and comprising a processor and a controller useable storage medium storing a controller readable program executed by the processor, the controller readable program comprising
a log module configured to record first log data to at least one first log instance in the cache;
a copy module configured to copy the at least one first log instance to a first log logical volume of a plurality of log logical volumes in a storage pool of the tape library when a copy policy is satisfied, wherein the copy is transparent to a user and the plurality of log logical volumes are not included in a billable storage volume count;
the log module further configured to record the log data to at least one second log instance in the cache, overwriting the at least one first log instance; and
a selection module configured to select a second log logical volume of the plurality of log logical volumes to receive the at least one second log instance from the cache in response to the first log logical volume satisfying a wrap policy.

17. The system of claim 16, wherein each log logical volume is selected in a specified order.

18. The system of claim 16, wherein the wrap policy is satisfied when a number of log instances copied to the first log logical volume exceeds a specified number.

19. The system of claim 16, the controller readable program further comprising an allocation module configured to allocate the plurality of log logical volumes in the storage pool for storing copies of log instances.

20. A method for deploying computer infrastructure, comprising integrating a controller useable storage medium storing a controller readable program into a controller, wherein the computer readable program when executed by a processor performs the following:
recording first log data to at least one first log instance in a cache;
copying the at least one first log instance to a first log logical volume of a plurality of log logical volumes in a storage pool when a copy policy is satisfied, wherein the copy is transparent to a user and the plurality of log logical volumes are hidden from the user and the plurality of log logical volumes are not included in a billable storage volume count;

recording second log data to at least one second log instance in the cache, overwriting the at least one first log instance; and selecting a second log logical volume of the plurality of log logical volumes to receive the at least one second log instance in response to the first log logical volume satisfying a wrap policy, wherein each log logical volume is selected in a specified order and the wrap policy is satisfied when a number of log instances copied to the first log logical volume exceeds a specified number.

* * * * *